(12) United States Patent
Ha et al.

(10) Patent No.: US 8,628,847 B2
(45) Date of Patent: Jan. 14, 2014

(54) ADHESIVE BINDER, ADHESIVE COMPOSITION INCLUDING THE SAME, OPTICAL MEMBER, AND ASSOCIATED METHODS

(75) Inventors: Kyoung Jin Ha, Uiwang-si (KR); Kil Sung Lee, Uiwang-si (KR); Mi Sun Kim, Uiwang-si (KR); Irina Nam, Uiwang-si (KR); Chang Min Lee, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 73 days.

(21) Appl. No.: 12/979,511

(22) Filed: Dec. 28, 2010

(65) Prior Publication Data

US 2011/0159283 A1 Jun. 30, 2011

(30) Foreign Application Priority Data

Dec. 29, 2009 (KR) ........................ 10-2009-0133206

(51) Int. Cl.
- *C09J 133/10* (2006.01)
- *B32B 27/30* (2006.01)
- *B32B 7/12* (2006.01)

(52) U.S. Cl.
USPC ........ 428/343; 427/516; 526/307.7; 526/301; 526/307.5; 525/453

(58) Field of Classification Search
USPC ................ 428/343; 525/453; 526/307.7, 301, 526/307.5; 427/516
See application file for complete search history.

(56) References Cited

U.S. PATENT DOCUMENTS

| 4,614,761 A * | 9/1986 | Takiyama et al. ................ 525/59 |
| 7,537,810 B2 * | 5/2009 | Hayashi et al. ................. 428/1.1 |
| 2009/0208741 A1 * | 8/2009 | Toyama et al. ......... 428/355 AC |

FOREIGN PATENT DOCUMENTS

| CN | 101508875 A | 8/2009 |
| JP | 2005-239878 | 9/2005 |

OTHER PUBLICATIONS

Chinese First Office Action in CN 2010-10622303.9, dated Jun. 1, 2012, with English translation (Ha, et al.).

* cited by examiner

*Primary Examiner* — Satya Sastri
(74) *Attorney, Agent, or Firm* — Lee & Morse, P.C.

(57) ABSTRACT

An adhesive binder, an adhesive composition including the same, an optical member, and associated methods, the adhesive binder including a (meth)acrylic copolymer having urethane, hydroxyl, aromatic, and vinyl groups in side chains thereof.

13 Claims, No Drawings

ADHESIVE BINDER, ADHESIVE COMPOSITION INCLUDING THE SAME, OPTICAL MEMBER, AND ASSOCIATED METHODS

BACKGROUND

1. Field

Embodiments relate to an adhesive binder, an adhesive composition including the same, an optical member, and associated methods.

2. Description of the Related Art

Optical films, e.g., polarizers, color filters, retardation films, elliptical polarizing films, reflective films, antireflective films, compensation films, brightness enhancement films, alignment films, light diffusion films, shatterproof glass films, surface protective films, and plastic LCD substrates, may be used in various optical members, e.g., for liquid crystal displays (LCDs).

SUMMARY

Embodiments are directed to an adhesive binder, an adhesive composition including the same, an optical member, and associated methods.

The embodiments may be realized by providing an adhesive binder including a (meth)acrylic copolymer having urethane, hydroxyl, aromatic, and vinyl groups in side chains thereof.

The (meth)acrylic copolymer may have repeating units represented by Formulae 1-1, 1-2, 1-3 and 1-4:

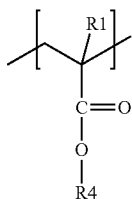
(1-1)

in Formula 1-1, R1 is a hydrogen atom or a methyl group and R4 is a $C_1$-$C_{20}$ alkyl group;

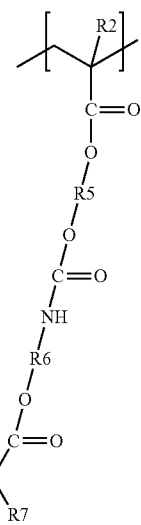
(1-2)

in Formula 1-2, R2 is a hydrogen atom or a methyl group, R5 and R6 are each independently a $C_1$-$C_{20}$ alkylene group, and R7 is a hydrogen atom or a methyl group;

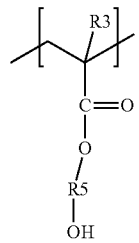
(1-3)

in Formula 1-3, R3 is a hydrogen atom or a methyl group and R5 is a $C_1$-$C_{20}$ alkylene group; and

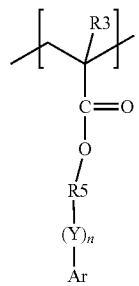
(1-4)

in Formula 1-4, R3 is a hydrogen atom or a methyl group, R5 is a $C_1$-$C_{20}$ alkylene group, Y is an oxygen or sulfur atom, n is 0 or 1, and Ar is a substituted or unsubstituted aromatic group.

The adhesive binder may have a weight average molecular weight of about 600,000 to about 2,000,000 g/mol.

The repeating units of Formulae 1-1, 1-2, 1-3, and 1-4 may be included in the (meth)acrylate copolymer in a ratio of about 65~95:1~4:1~10:3~30.

The (meth)acrylic copolymer may include about 0.5 to about 4 mole % of vinyl groups therein.

The adhesive binder may have a viscosity of about 1,000 to about 50,000 cps at 25° C.

The embodiments may also be realized by providing an adhesive composition including the adhesive binder of an embodiment; a curing agent; and a silane coupling agent.

The adhesive binder may be included in an amount of about 94 to about 99.8% by weight, the curing agent may be included in an amount of about 0.01 to about 4% by weight, and the silane coupling agent may be included in an amount of about 0.01 to about 3% by weight.

The adhesive composition may further include about 0.1 to about 5% by weight of an initiator.

The curing agent may be an epoxy compound, an isocyanate compound, or a combination thereof.

The embodiments may also be realized by providing a method for preparing an adhesive binder, the method including preparing a first reaction product by adding an initiator to a mixture of a $C_1$-$C_{20}$ alkyl(meth)acrylate, an aromatic (meth)acrylate, and a hydroxyl group-containing (meth)acrylate, and initiating a second reaction by adding an isocyanate group-containing (meth)acrylate and a catalyst to the first reaction product.

The $C_1$-$C_{20}$ alkyl(meth)acrylate, the aromatic (meth)acrylate, the hydroxyl group-containing (meth)acrylate, and the isocyanate group-containing (meth)acrylate may be used in amounts of about 65 to about 95% by weight, about 3 to about 30% by weight, about 1 to about 10% by weight and about 1 to about 4% by weight, respectively.

The method may further include diluting the first reaction product with a solvent prior to initiating the second reaction.

The embodiments may also be realized by providing an optical member including an optical film; and one or two adhesive layers on one or both surfaces of the optical film, wherein the one or two adhesive layers are formed from the adhesive composition of an embodiment.

The optical film may be a polarizing film.

The embodiments may also be realized by providing method for forming an adhesive layer, the method including coating the adhesive composition of an embodiment on an optical film, heat-drying the coating, and curing the heat-dried coating by UV irradiation.

DETAILED DESCRIPTION

Korean Patent Application No. 10-2009-0133206, filed on Dec. 29, 2009, in the Korean Intellectual Property Office, and entitled: "Adhesive Binder, Method for Preparing the Same, Adhesive Composition Comprising the Same and Optical Member Using the Same," is incorporated by reference herein in its entirety.

Example embodiments will now be described so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present.

Polarizers may have a multilayer structure, e.g., a polarizing film (including, e.g., an iodine compound or a dichroic polarizing material arranged in a constant direction), and triacetyl cellulose (TAC) films as protective films (on surfaces of the polarizing film to protect the polarizing film). The polarizers may additionally include a retardation film having an anisotropic molecular arrangement or a viewing angle compensation film, e.g., a liquid crystal film. The above-mentioned films may exhibit different physical properties due to differences in molecular structure and composition of their constituent materials.

These films may exhibit poor dimensional stability under high temperature and high humidity conditions owing to expansion or shrinkage of their constituent materials having an anisotropic molecular arrangement. When a polarizer is fixed by an adhesive and expands or shrinks under high temperature and high humidity conditions, stress may be concentrated at TAC layers and birefringence may take place. As a result, light leakage may occur in the polarizer. Light leakage may occur when optical isotropy of stretched polarizing films is changed to anisotropy during shrinkage under high temperature and high humidity conditions.

Preventing light leakage may include controlling the shrinkage of films by increasing molecular weight or cross-linking density of constituent components of adhesives. However, such control may cause various defects, bringing about a reduction in durability. Enhancement of modulus (i.e. improvement of the cross-linking density) and improvement of the durability of films by UV curing as well as heat curing as curing processes may also prevent light leakage.

Acrylic binders may be used in adhesive compositions for polarizers because of their advantages of, e.g., high transmittance, ease of design, low price, and relative ease of molecular weight control. Adhesive binders for polarizers may have a weight average molecular weight of about 1,000,000 or more. An adhesive binder having a molecular weight of 600,000 or less may exhibit low endurance reliability under high temperature and high humidity conditions. For example, moisture may enter between a base film layer and an adhesive coating layer to cause poor adhesion between the layers, thereby resulting in interlayer separation.

Adhesive binders having a molecular weight of about 2,000,000 or more may be prepared by suspension polymerization rather than by solution polymerization. Solution polymerization may not be suitable for the preparation of high molecular weight adhesive binders owing to its difficulty in the design of polymerization. However, suspension polymerization may involve subsequent cleaning, dehydration, and drying steps, leading to high production costs. Organic solvents may be used for suspension polymerization in consideration of production costs.

Controlling light leakage may include using a small amount of a curing agent in the preparation of an adhesive binder having a molecular weight of 1,500,000 to 2,000,000 in order to attain maximum flexibility of a coating. However, large portions of the coating may remain uncured. Thus, the adhesive binder may undesirably stick to a base unless it has a high molecular weight and a low polydispersity index.

Using a large amount of a curing agent in the preparation of an adhesive binder having a weight average molecular weight of 1,000,000 or less may also control light leakage. However, such a method may include the use of a large amount of the curing agent, thereby causing severe changes over time after curing. Thus, a long aging time for the reaction of the curing agent after coating may be required.

Adhesive Binder and Preparation Method Thereof

According to an embodiment, an adhesive binder may include a (meth)acrylic copolymer having urethane, hydroxyl, aromatic, and vinyl groups in side chains thereof.

In an implementation, the (meth)acrylic copolymer may include repeating units represented by Formulae 1-1, 1-2, 1-3, and 1-4, below.

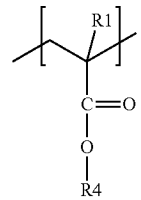

(1-1)

In Formula 1-1, R1 may be a hydrogen atom or a methyl group and R4 may be a $C_1$-$C_{20}$ alkyl group.

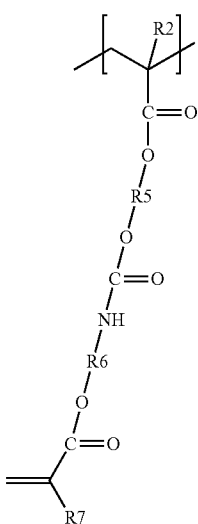

(1-2)

In Formula 1-2, R2 may be a hydrogen atom or a methyl group, R5 and R6 may each independently be a $C_1$-$C_{20}$ alkylene group, and R7 may be a hydrogen atom or a methyl group.

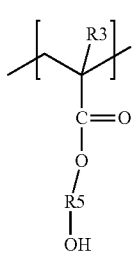

(1-3)

In Formula 1-3, R3 may be a hydrogen atom or a methyl group and R5 may be a $C_1$-$C_{20}$ alkylene group.

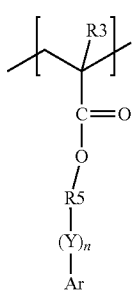

(1-4)

In Formula 1-4, R3 may be a hydrogen atom or a methyl group, R5 may be a $C_1$-$C_{20}$ alkylene group, Y may be an oxygen or sulfur atom, n may be 0 or 1, and Ar may be a substituted or unsubstituted aromatic group.

Preferably, R1, R2, and R3 in Formulae 1-1 to 1-4 are all hydrogen atoms.

R4 in Formula 1-1 is preferably a $C_1$-$C_{12}$ alkyl group and more preferably an ethyl, n-propyl, n-butyl, isobutyl, tert-butyl, pentyl, or hexyl group. Each R5 in Formulae 1-2, 1-3, and 1-4 is preferably a $C_1$-$C_{12}$ alkylene group and more preferably a propylene, butylene, or pentylene group. R6 in Formula 1-2 is preferably a $C_1$-$C_{12}$ alkylene group and more preferably a methylene, ethylene, propylene, butylene, or pentylene group. R7 in Formula 1-2 is preferably a methyl group.

Ar in Formula 1-4 may include at least one of phenyl, methylphenyl, methylethylphenyl, methoxyphenyl, cyclohexylphenyl, chlorophenyl, bromophenyl, phenylphenyl, and benzylphenyl groups.

A ratio of the repeating units of Formulae 1-1, 1-2, 1-3, and 1-4 in the (meth)acrylic copolymer may be about 65~95:1~4:1~10:3~30, preferably about 75~90:1~3:1~5:5~20, and more preferably about 80~86:1~3:1~4:10~15.

The adhesive binder may have a weight average molecular weight (Mw) of about 600,000 to about 2,000,000 g/mol. Maintaining the Mw of the adhesive binder at about 600,000 to about 2,000,000 g/mol may help ensure that the binder is easily prepared by polymerization and that the binder may be used to form a flexible coating with the use of a small amount of a curing agent. In addition, the adhesive binder may be used to minimize aging time and prevent light leakage in a film prepared from a composition including the adhesive binder. The adhesive binder preferably has a weight average molecular weight of about 800,000 to about 1,500,000 g/mol, e.g., about 850,000 to about 1,000,000 g/mol.

In an implementation, the (meth)acrylate copolymer may have a weight average molecular weight (Mw) of about 600,000 to about 2,000,000 g/mol. The (meth)acrylate copolymer preferably has a weight average molecular weight of about 800,000 to about 1,500,000 g/mol, e.g., about 850,000 to about 1,000,000 g/mol.

The Mw of the adhesive binder may be lower than a Mw of general adhesive binders for polarizing films. In the adhesive binder having the lower Mw, introduction of the urethane groups to the structure of the adhesive binder may provide high adhesive strength to the adhesive binder.

The urethane groups may be present in the (meth)acrylic copolymer in an amount of about 0.5 to about 4 mole %, and preferably about 0.5 to about 1.5 mole %. Maintaining the amount of the urethane groups at about 0.5 to about 4 mole % may help maintain high adhesive strength of the adhesive binder at a constant level, even after photocuring. Maintaining the amount of the urethane groups at about 0.5 to about 4 mole % may also help increase internal cohesive strength of an adhesive film (prepared from an adhesive composition including the adhesive binder) to attain improved modulus.

The vinyl groups may be present in the (meth)acrylic copolymer in an amount of about 0.5 to about 4 mole % and preferably about 0.5 to about 1.5 mole %. Maintaining the amount of the vinyl groups at about 0.5 to about 4 mole % may help ensure a reduction in aging time while maintaining high adhesive strength in a film prepared from a composition including the adhesive binder.

The adhesive binder may have a viscosity of about 1,000 to about 50,000 cps at 25° C. Maintaining the viscosity of the adhesive binder at about 1,000 to about 50,000 cps may help ensure that an adhesive composition including the adhesive binder exhibits physical properties suitable for coating.

The (meth)acrylic copolymer may be prepared by polymerization of a monomer mixture including a $C_1$-$C_{20}$ alkyl (meth)acrylate, a hydroxyl group-containing (meth)acrylate, an aromatic (meth)acrylate, and an isocyanate group-containing (meth)acrylate.

Preferably, the (meth)acrylic copolymer is prepared by adding an initiator to a mixture of the $C_1$-$C_{20}$ alkyl(meth)acrylate, the aromatic (meth)acrylate, and the hydroxyl group-containing (meth)acrylate to initiate a reaction (first reaction) and prepare a first reaction product. Then, the isocyanate group-containing (meth)acrylate and another initiator or catalyst may be added to the first reaction product to react the isocyanate group-containing (meth)acrylate with the first reaction product (second reaction). In an implementation, the method may include adding the initiator to the mixture of the $C_1$-$C_{20}$ alkyl(meth)acrylate, the aromatic (meth)acrylate, and the hydroxyl group-containing (meth)acrylate to initiate the first reaction to form a terpolymer, i.e., a copolymer having three sets of repeating units or base groups. Then, the second reaction may include a reaction in which a portion of one of the repeating units is further reacted with an isocyanate.

In an embodiment, the first reaction product may be diluted with a solvent prior to the second reaction, because the first reaction product may be highly viscous.

Examples of the $C_1$-$C_{20}$ alkyl(meth)acrylate may include, but are not necessarily limited to, methyl(meth)acrylate, ethyl (meth)acrylate, propyl (meth)acrylate, butyl(meth)acrylate, pentyl(meth)acrylate, hexyl(meth)acrylate, heptyl(meth)acrylate, octyl(meth)acrylate, nonyl(meth)acrylate, decyl (meth)acrylate, and lauryl(meth)acrylate. These $C_1$-$C_{20}$ alkyl (meth)acrylates may be used alone or as a mixture of two or more thereof. As used herein, the term "(meth)acrylate" may refer to both acrylate and methacrylate. Methyl acrylate, ethyl acrylate, n-butyl acrylate, isobutyl acrylate, and tert-butyl acrylate are preferred, methyl acrylate, ethyl acrylate, and n-butyl acrylate are more preferred, and methyl acrylate and n-butyl acrylate are particularly preferred.

The $C_1$-$C_{20}$ alkyl(meth)acrylate may be used in an amount of about 65 to about 95% by weight, preferably about 75 to about 90% by weight, and more preferably about 80 to about 86% by weight, based on a total weight of the monomers forming the (meth)acrylate copolymer. Maintaining the amount of the $C_1$-$C_{20}$ alkyl(meth)acrylate at about 65 to about 95% by weight may help maintain initial adhesive strength of the adhesive binder. In an implementation, the $C_1$-$C_{20}$ alkyl (meth)acrylate may be used in an amount of about 78 to about 85% by weight.

Examples of the aromatic (meth)acrylate may include, but are not necessarily limited to, 2-ethylphenoxy(meth)acrylate, 2-ethylthiophenyl(meth)acrylate, phenyl (meth)acrylate, benzyl(meth)acrylate, 2-phenylethyl(meth)acrylate, 3-phenylpropyl (meth)acrylate, 4-phenylbutyl(meth)acrylate, 2-2-methylphenylethyl(meth)acrylate, 2-3-methylphenylethyl (meth)acrylate, 2-4-methylphenylethyl(meth)acrylate, 2-(4-propylphenyl)ethyl(meth)acrylate, 2-(4-(1-methylethyl) phenyl)ethyl(meth)acrylate, 2-(4-methoxyphenyl)ethyl (meth)acrylate, 2-(4-cyclohexylphenyl)ethyl (meth)acrylate, 2-(2-chlorophenyl)ethyl(meth)acrylate, 2-(3-chlorophenyl) ethyl (meth)acrylate, 2-(4-chlorophenyl)ethyl(meth)acrylate, 2-(4-bromophenyl)ethyl (meth)acrylate, 2-(3-phenylphenyl)ethyl(meth)acrylate, and 2-(4-benzylphenyl)ethyl (meth)acrylate. These aromatic (meth)acrylates may be used alone or as a mixture of two or more thereof. Benzyl methacrylate and benzyl acrylate are particularly preferred.

The aromatic (meth)acrylate may be used in an amount of about 3 to about 30% by weight, preferably about 5 to about 20% by weight, and more preferably about 10 to about 15% by weight, based on the total weight of the monomers forming the (meth)acrylate copolymer. Maintaining the amount of the aromatic (meth)acrylate about 3 to about 30% by weight may help facilitate preparation of an adhesive capable of preventing light leakage. In an implementation, the aromatic (meth) acrylate may be used in an amount of about 7 to about 25% by weight.

Examples of the hydroxyl group-containing (meth)acrylate may include, but are not necessarily limited to, 2-hydroxyethyl(meth)acrylate, 4-hydroxybutyl (meth)acrylate, 2-hydroxypropyl(meth)acrylate, 2-hydroxybutyl(meth)acrylate, 6-hydroxyhexyl(meth)acrylate, 1,4-cyclohexanedimethanol mono(meth)acrylate, chloro-2-hydroxypropyl acrylate, diethylene glycol mono(meth)acrylate, 1,6-hexanediol mono(meth)acrylate, pentaerythritol tri(meth) acrylate, dipentaerythritol penta(meth)acrylate, neopentyl glycol mono(meth)acrylate, trimethylolpropane di(meth) acrylate, trimethylolethane di(meth)acrylate, 2-hydroxypropyl (meth)acrylate, 2-hydroxybutyl(meth)acrylate, 2-hydroxy-3-phenyloxypropyl (meth)acrylate, 4-hydroxycyclohexyl(meth)acrylate, 2-hydroxyethylacrylamide, and cyclohexanedimethanol monoacrylate. These hydroxyl group-containing (meth)acrylates may be used alone or as a mixture of two or more thereof. Other examples of the hydroxyl group-containing (meth)acrylate may include addition reaction products of glycidyl group-containing compounds, such as alkyl glycidyl ethers, allyl glycidyl ethers and glycidyl(meth)acrylates, with (meth)acrylic acid. Of the above, 2-hydroxyethyl(meth)acrylate, 4-hydroxybutyl (meth)acrylate, 2-hydroxyethylacrylamide and cyclohexanedimethanol monoacrylate are preferred, 2-hydroxyethyl (meth)acrylate, 4-hydroxybutyl(meth)acrylate and 2-hydroxyethylacrylamide are more preferred, and 2-hydroxyethyl acrylate, and 2-hydroxyethylacrylamide are particularly preferred.

The hydroxyl group-containing (meth)acrylate may be used in an amount of about 1 to about 10% by weight, preferably about 1 to about 5% by weight, and more preferably about 1 to about 4% by weight, based on the total weight of the monomers forming the (meth)acrylate copolymer. Maintaining the amount of the hydroxyl group-containing (meth) acrylate at about 1 to about 10% by weight may help minimize a number of hydroxyl groups remaining after reaction with the monomer having vinyl groups and the subsequent reaction with an isocyanate curing agent. Thus changes over time resulting from the presence of hydroxyl groups after an adhesive (including the adhesive binder) is attached to a substrate may be minimized.

Examples of the isocyanate group-containing (meth)acrylate may include, but are not limited to, 2-isocyanatoethyl methacrylate, 2-isocyanatoethyl acrylate, 2-isocyanatopropyl acrylate, 2-(O-[1'-methylpropylideneamino]carboxyamino)ethyl methacrylate, 2-isocyanatoethyl 2-propenoate, and 1,1-bis(acryloyloxymethylethyl isocyanate). These isocyanate group-containing (meth)acrylates may be used alone or as a mixture of two or more thereof. Of these, 2-isocyanatoethyl methacrylate and 2-isocyanatoethyl acrylate are preferred.

The isocyanate group-containing (meth)acrylate may be used in an amount of about 1 to about 4% by weight and preferably about 2 to about 4% by weight, based on the total weight of the monomers. Maintaining the amount of the isocyanate group-containing (meth)acrylate at about 1 to about 4% by weight may help ensure high adhesive strength of the adhesive binder is maintained at a constant level even after photocuring. Maintaining the amount of the isocyanate group-containing (meth)acrylate at about 1 to about 4% by weight may also help increase an internal cohesive strength of an adhesive film (prepared from an adhesive composition including the adhesive binder) to attain improved modulus.

The initiators used to synthesize the adhesive binder may be any suitable initiator, e.g., peroxide initiators and azo initiators. Azobisisobutyronitrile (AIBN) is preferred. The initiators may be used in an amount of about 0.01 to about 2 parts by weight, based on 100 parts by weight of the monomer mixture.

The solvent may be an organic solvent having a low boiling point of about 70 to about 85° C. Methyl ethyl ketone, ethyl acetate, and acetone are preferred.

Adhesive Composition

The embodiments provide an adhesive composition including the adhesive binder (a), a curing agent (b), and a silane coupling agent (c).

In an implementation, the adhesive binder (a), the curing agent (b), and the silane coupling agent (c) may be present in amounts of about 94 to about 99.8% by weight, about 0.01 to about 4% by weight, and about 0.01 to about 3% by weight, respectively.

The curing agent (b) may include, e.g., an epoxy compound, an isocyanate compound, or a combination thereof.

Examples of the isocyanate curing agent may include, but are not necessarily limited to, toluene diisocyanate, xylene diisocyanate, diphenylmethane diisocyanate, hexamethylene diisocyanate, isophorone diisocyanate, tetramethylxylene diisocyanate, naphthalene diisocyanate, and their adducts with polyols (e.g., trimethylolpropane). These isocyanate curing agents may be used alone or as a mixture of two or more thereof.

Examples of the epoxy curing agent may include, but are not necessarily limited to, ethylene glycol diglycidyl ether, triglycidyl ether, trimethylolpropane triglycidyl ether, N,N, N'N'-tetraglycidylethylenediamine, and glycerin diglycidyl ether. These epoxy curing agents may be used alone or as a mixture of two or more thereof.

The curing agent (b) may be present in an amount of about 0.01 to about 4% by weight, preferably about 0.1 to about 3% by weight, and more preferably about 0.5 to about 2% by weight, based on a total weight of the adhesive composition.

The silane coupling agent (c) may improve adhesion stability and reliability of the adhesive composition. Any suitable silane coupling agent may be used.

Examples of the silane coupling agent may include, but are not limited to, γ-glycidoxypropyltrimethoxysilane, γ-glycidoxypropylmethyldiethoxysilane, γ-glycidoxypropyltriethoxysilane, 3-mercaptopropyltrimethoxysilane, vinyltrimethoxysilane, vinyltriethoxysilane, γ-methacryloxypropyltrimethoxysilane, γ-methacryloxypropyltriethoxysilane, γ-aminopropyltriethoxysilane, 3-isocyanatopropyltriethoxysilane, and γ-acetoacetatopropyltrimethoxysilane. These silane coupling agents may be used alone or as a mixture of two or more thereof.

The silane coupling agent (c) may be present in an amount of about 0.01 to about 3% by weight, preferably about 0.05 to about 2% by weight, and more preferably about 0.1 to about 1.5% by weight, based on the total weight of the adhesive composition. Maintaining the amount of the silane coupling agent at about 0.01 to about 3% by weight may help ensure better adhesion stability and reliability of an adhesive prepared from the adhesive composition.

In an implementation, the adhesive composition may further include an initiator (d). The initiator (d) may include a photoinitiator that is activated by UV light or electron beam radiation to activate carbon-carbon double bonds of the adhesive binder and induce radical reactions. Examples of the initiator (d) may include, but are not limited to, α-hydroxyketone type compounds and benzyl ketal type compounds. These initiators may be used alone or as a mixture of two or more thereof. Preferred are α-hydroxyketone type compounds, e.g., 1-hydroxycyclohexyl phenyl ketone, 2-hydroxy-2-methyl-1-phenyl-1-propanone, and 2-hydroxy-1-[4-(2-hydroxyethoxy)phenyl]-2-methyl-1-propanone.

The initiator (d) may be included in an amount of about 0.1 to about 5% by weight and preferably about 0.5 to about 3% by weight, based on the total weight of the adhesive composition. Maintaining the amount of the initiator (d) at about 0.1 to about 5% by weight may help prevent an adhesive prepared from the adhesive composition from losing adhesive strength after photocuring while maintaining excellent pick-up properties after photocuring.

If desired, the adhesive composition may further include one or more additives. The additives may include, e.g., UV stabilizers, antioxidants, colorants, reinforcing agents, fillers, defoaming agents, surfactants, and plasticizers.

The adhesive composition may be prepared by any suitable method. In an implementation, the adhesive composition may be prepared by homogenizing the adhesive binder (a), the initiator (d), the curing agent (b), and the silane coupling agent (c) in the presence of a cross-linking catalyst. During mixing, if desired, a solvent may also be added to dilute the mixture.

Adhesive Layer

The embodiments also provide a method for forming an adhesive layer using the adhesive composition.

The method may include coating the adhesive composition on a substrate, e.g., an optical film, heat-drying the coating, and curing the heat-dried coating by UV irradiation.

The adhesive layer may have a thickness of about 10 to about 100 μm and preferably about 20 to about 70 μm.

Typically, an adhesive layer may be formed by coating an adhesive composition, heating (to remove an organic solvent contained therein, e.g., heat drying) to form a film, and aging the film at about 40° C. for about 5 days. According to an embodiment, the adhesive composition may be cured with UV light immediately after heat drying. The UV curing may advantageously minimize aging time. The method according to an embodiment may include aging at a temperature of about 40° C. for a relatively short time of, e.g., about 1-2 days (as compared to about 5 days). According to the method of an embodiment, cohesive strength of the coating may be improved by UV curing, which may minimize introduction of the heat curing agent. As a result, improved long-term stability of the film may be attained.

Optical Member

Another embodiment provides an optical member formed using the adhesive composition. For example, the optical member may include, e.g., an optical film and one or two adhesive layers on one or both surfaces of the optical film, the adhesive layers being formed from the adhesive composition according to an embodiment.

Examples of the optical film may include polarizers, color filters, retardation films, elliptical polarizing films, reflective films, antireflective films, compensation films, brightness enhancement films, alignment films, light diffusion films, shatterproof glass films, surface protective films, and plastic LCD substrates. The optical film is preferably a polarizing film.

The following Examples and experiments are given for illustrative purposes only and are not intended to limit the scope of this disclosure. Moreover, the Comparative Examples are set forth to highlight certain characteristics of certain embodiments and are not to be construed as either limiting the scope of the invention as exemplified in the Examples or as necessarily always being outside the scope of the invention in every respect

EXAMPLES

Preparative Example 1

Preparation of Binder A 60 g of ethyl acetate was placed in a 1 liter four-neck flask. Then, 84 g of butyl acrylate, 10 g of benzyl methacrylate, and 4 g of 4-hydroxybutyl acrylate were added thereto. After heating to 70° C., 0.08 g of an initiator (Vazo-52, DuPont) and 20 g of ethyl acetate were added. The mixture was reacted for 3 hr. To the mixture was added 320 g of ethyl acetate. After cooling to 40° C., 2 g of 2-isocyanatoethyl methacrylate and 0.01 g of DBTDL as a catalyst were added. The resulting mixture was allowed to react for 12 hr to form a polymerization product. Nitrogen was supplied into the flask throughout the reaction at a rate of 10 cc/min. The polymerization product had a viscosity of 4,000 to 10,000 cps at 25° C. and a solids content of 20%.

Preparative Example 2

Preparation of Binder B

The procedure of Preparative Example 1 was repeated except that the butyl acrylate, benzyl methacrylate, 4-hydroxybutyl acrylate, and 2-isocyanatoethyl methacrylate were used in amounts of 81 g, 15 g, 3 g, and 1 g, respectively.

Preparative Example 3

Preparation of Binder C

The procedure of Preparative Example 1 was repeated except that the butyl acrylate, benzyl methacrylate, and 4-hydroxybutyl acrylate were used in amounts of 86 g, 10 g, and 4 g, respectively, without the use of 2-isocyanatoethyl methacrylate.

Preparative Example 4

Preparation of Binder D

The procedure of Preparative Example 1 was repeated except that the butyl acrylate, benzyl methacrylate, 4-hydroxybutyl acrylate, and 2-isocyanatoethyl methacrylate were used in amounts of 78 g, 10 g, 7 g, and 5 g, respectively.

Preparative Example 5

Preparation of Binder E

The procedure of Preparative Example 1 was repeated except that the butyl acrylate, 4-hydroxybutyl acrylate, and 2-isocyanatoethyl methacrylate were used in amounts of 88 g, 7 g, and 5 g, respectively.

Examples 1-4 and Comparative Examples 1-4

Preparation of Adhesive compositions

Each of the adhesive binders prepared in Preparative Examples 1-5 was mixed with a curing agent (DN-955, Aekyung Chemical), a silane coupling agent (Z-6016, DOW-CORNING), and a photoinitiator (Irgacure 184, Ciba Chemical) to prepare the compositions shown in Table 1, below. 30 parts by weight of ethyl acetate was added to the mixture. The resulting mixture was stirred for 30 min to prepare an adhesive composition. Physical properties of the adhesive composition were evaluated according to the following procedures.

Evaluation of Physical Properties (1) Tackiness: The tackiness of the adhesive compositions was measured using a probe tack tester (tacktoc-2000) in accordance with ASTM D2979-71. Specifically, after a tip of the probe was brought into contact with each of the adhesive compositions (at a rate of 10±0.1 mm/sec under a contact load of 9.79±1.01 kPa for 1.0±0.01 sec), a maximum force required to separate the tip from the adhesive composition was defined as the tackiness value of the adhesive composition.

(2) Peel strength: Each of the adhesive compositions was coated on a polyethylene terephthalate film and dried to form a coating having a thickness of 25±3 μm. The coating was attached to one surface of a polarizing film and aged at 40° C. and RH 65% for 2 days. The peel strength of the resulting film was measured in accordance with KS-A-01107 (8), a testing method for adhesive tapes and sheets. First, the film was cut into a sample having a size of 25 mm (w)×250 mm (1). Then, the sample was attached to a glass plate and pressed by one reciprocation of a press roller at a rate of 300 mm/min under a load of 2 kg to manufacture a test piece. 30 min after pressing, a portion (~25 mm) of the sample was folded, turned over 180° and peeled from the glass plate. Then, the glass plate and the peeled portion of the sample were fixed to upper and lower clips of a tensile tester (Instron Series 1X/s Automated materials Tester-3343), respectively. The load required to peel the sample from the test piece while pulling at a tensile rate of 300 mm/min was measured.

(3) Light leakage: A polarizer was coated with each of the adhesive compositions and attached to a glass substrate (100 mm×175 mm) to manufacture a specimen. The specimen was allowed to set at 80° C. for 250 hr (dry heat conditions), at 60° C./RH 90% for 250 hr (moist heat conditions), and at room temperature for at least 1 hr. Then, the light leakage of the specimen was observed using a backlight in a darkroom to determine uniformity of the coated polarizer. The observation was made with naked eyes and using a brightness tester. The light leakage was evaluated based on the following criteria.

O: Difficult to determine non-uniformity

Δ: Slight non-uniformity observed

X: Non-uniformity observed

TABLE 1

|  |  | Examples | | | | Comparative Examples | | | |
|---|---|---|---|---|---|---|---|---|---|
|  |  | 1 | 2 | 3 | 4 | 1 | 2 | 3 | 4 |
| Binders | A | 94 | 97 | — | — | 97 | — | — | — |
|  | B | — | — | 94 | 97 | — | — | — | — |
|  | C | — | — | — | — | — | 97 | — | — |
|  | D | — | — | — | — | — | — | 97 | — |
|  | E | — | — | — | — | — | — | — | 97 |
| Curing agent | | 3 | 1 | 3 | 1 | 0 | 1 | 1 | 1 |
| Silane coupling agent | | 1 | 1 | 1 | 1 | 1 | 1 | 1 | 1 |
| Photoinitiator | | 2 | 1 | 2 | 1 | 2 | 1 | 1 | 1 |

TABLE 2

| | Examples | | | | Comparative Examples | | | |
|---|---|---|---|---|---|---|---|---|
| | 1 | 2 | 3 | 4 | 1 | 2 | 3 | 4 |
| Tackiness (gf) | 105 | 120 | 90 | 110 | 125 | 70 | 140 | 150 |
| Peel strength (N/25 mm) | 500 | 550 | 400 | 430 | 600 | 350 | 650 | 580 |
| Light leakage | ○ | ○ | ○ | ○ | X | Δ | Δ | X |

As may be seen from the results in Table 2, the adhesive compositions of Examples 1-4 were highly durable, prevented light from leaking, and exhibited high tackiness and peel strength. In contrast, the adhesive composition of Comparative Example 1, which was prepared without using any curing agent, exhibited high adhesive strength after aging but had poor reworkability. Further, light leakage was observed in the adhesive composition of Comparative Example 1. The adhesive composition of Comparative Example 2, which was prepared using binder C (having no urethane groups), exhibited low adhesive strength. As a result, moisture infiltrated the adhesive composition of Comparative Example 2 during testing for high temperature/humidity reliability, leading to poor adhesion to the substrate and light leakage. The adhesive composition of Comparative Example 3, which was prepared using binder D (having an excess of urethane groups), exhibited high initial adhesive strength but had poor reworkability. Further, light leakage was observed in the adhesive composition of Comparative Example 3. Moisture infiltrated the adhesive composition of Comparative Example 4, which was prepared using binder E (having an excess of vinyl groups), during testing for high temperature/humidity reliability, leading to poor adhesion to the substrate and light leakage.

As is apparent from the foregoing, the adhesive binder of the embodiments may be aged for a reduced time and may be capable of preventing light leakage (a frequent phenomenon in polarizing films), while maintaining good durability under high temperature and high humidity conditions. In addition, the adhesive binder may be easy to prepare by polymerization and may exhibit high adhesive strength. The adhesive composition of the embodiments may be highly durable and may prevent light leakage while minimizing aging time. The optical member of an embodiment may exhibit well-balanced physical properties.

The embodiments provide an adhesive binder capable of reducing aging time for an adhesive formed therefrom. Light leakage may be prevented in an optical member including an adhesive formed from an adhesive composition including the adhesive binder. In addition, good durability under high temperature and high humidity conditions may be maintained.

The embodiments provide an adhesive binder having a particular molecular weight that is capable of achieving high adhesive strength along with ease of preparation.

The embodiments provide a method for easily preparing the adhesive binder by polymerization.

The embodiments provide an adhesive composition including the adhesive binder and is capable of preparing an adhesive exhibiting improved durability, light leakage prevention, and minimum aging time.

The embodiments provide a method for forming an adhesive layer using the adhesive binder in high productivity.

The embodiments provide an optical member including an adhesive formed from the adhesive composition and exhibiting well-balanced physical properties.

Thus, the embodiments provide an adhesive that is advantageous in terms of tackiness, peel strength, and light leakage prevention, which may be desirable for an adhesive, is highly durable under high temperature/humidity conditions, and takes a short time to age.

The embodiments provide an adhesive binder and composition that include a copolymer having particular functional groups in side chains thereof. Thus, aging time may be reduced and light leakage may be prevented in a polarizing film prepared therefrom while maintaining good durability under high temperature and high humidity conditions.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An adhesive binder, comprising a (meth)acrylic copolymer having repeating units represented by Formulae 1-1, 1-2, 1-3 and 1-4:

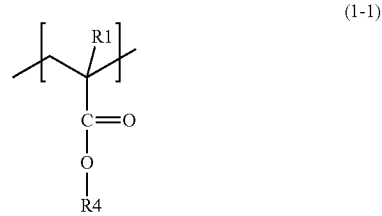

(1-1)

in Formula 1-1, R1 is a hydrogen atom or a methyl group and R4 is a $C_1$-$C_{20}$ alkyl group;

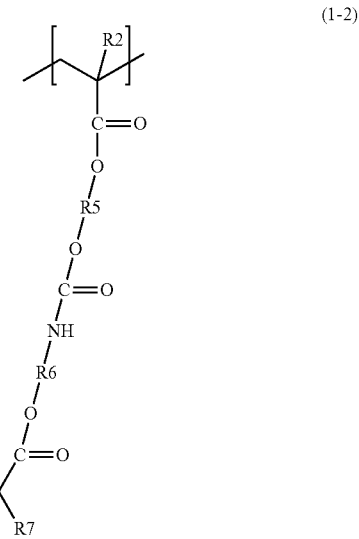

(1-2)

in Formula 1-2, R2 is a hydrogen atom or a methyl group, R5 and R6 are each independently a $C_1$-$C_{20}$ alkylene group, and R7 is a hydrogen atom or a methyl group;

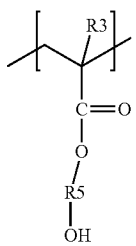

(1-3)

in Formula 1-3, R3 is a hydrogen atom or a methyl group and R5 is a $C_1$-$C_{20}$ alkylene group; and

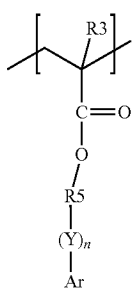

(1-4)

in Formula 1-4, R3 is a hydrogen atom or a methyl group, R5 is a $C_1$-$C_{20}$ alkylene group, Y is an oxygen or sulfur atom, n is 0 or 1, and Ar is a substituted or unsubstituted aromatic group, wherein the repeating units of Formulae 1-1, 1-2, 1-3, and 1-4 are included in the (meth)acrylate copolymer in a weight ratio of about 75~90:1~3:1~5: 5~20.

2. The adhesive binder as claimed in claim 1, wherein the adhesive binder has a weight average molecular weight of about 600,000 to about 2,000,000 g/mol.

3. The adhesive binder as claimed in claim 1, wherein the (meth)acrylic copolymer includes about 0.5 to about 4 mole % of vinyl groups therein.

4. The adhesive binder as claimed in claim 1, wherein the adhesive binder has a viscosity of about 1,000 to about 50,000 cps at 25° C.

5. An adhesive composition, comprising:
the adhesive binder as claimed in claim 1;
a curing agent; and
a silane coupling agent.

6. The adhesive composition as claimed in claim 5, wherein:
the adhesive binder is included in an amount of about 94 to about 99.8% by weight,
the curing agent is included in an amount of about 0.01 to about 4% by weight, and
the silane coupling agent is included in an amount of about 0.01 to about 3% by weight.

7. The adhesive composition as claimed in claim 6, further comprising about 0.1 to about 5% by weight of an initiator.

8. The adhesive composition as claimed in claim 7, wherein the curing agent is an epoxy compound, an isocyanate compound, or a combination thereof.

9. A method for preparing an adhesive binder, the method comprising:
preparing a first reaction product by adding an initiator to a mixture of $C_1$-$C_{20}$ alkyl (meth)acrylate, aromatic (meth) acrylate, and hydroxyl group-containing (meth)acrylate monomers, and initiating a second reaction by adding an isocyanate group-containing (meth)acrylate monomer and a catalyst to the first reaction product, wherein the $C_1$-$C_{20}$ alkyl (meth)acrylate, aromatic (meth) acrylate, hydroxyl group-containing (meth)acrylate, and isocyanate group-containing (meth)acrylate monomers are selected to provide an adhesive binder that includes a (meth)acrylic copolymer having repeating units represented by Formulae 1-1, 1-2, 1-3 and 1-4:

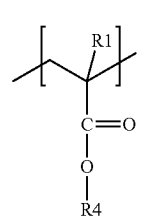

(1-1)

in Formula 1-1, R1 is a hydrogen atom or a methyl group and R4 is a $C_1$-$C_{20}$ alkyl group;

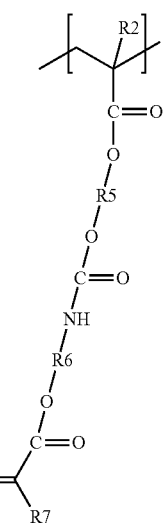

(1-2)

in Formula 1-2, R2 is a hydrogen atom or a methyl group, R5 and R6 are each independently a $C_1$-$C_{20}$ alkylene group, and R7 is a hydrogen atom or a methyl group;

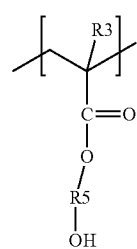

(1-3)

in Formula 1-3, R3 is a hydrogen atom or a methyl group and R5 is a $C_1$-$C_{20}$ alkylene group; and

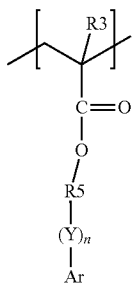

(1-4)

in Formula 1-4, R3 is a hydrogen atom or a methyl group, R5 is a $C_1$-$C_{20}$ alkylene group, Y is an oxygen or sulfur atom, n is 0 or 1, and Ar is a substituted or unsubstituted aromatic group, wherein the repeating units of Formulae 1-1, 1-2, 1-3, and 1-4 are included in the (meth)acrylate copolymer in a weight ratio of about 75~90:1~3:1~5:5~20.

10. The method as claimed in claim 9, further comprising diluting the first reaction product with a solvent prior to initiating the second reaction.

11. An optical member, comprising:

an optical film; and one or two adhesive layers on one or both surfaces of the optical film, wherein the one or two adhesive layers are formed from the adhesive composition as claimed in claim 8.

12. The optical member as claimed in claim 11, wherein the optical film is a polarizing film.

13. A method for forming an adhesive layer, the method comprising coating the adhesive composition as claimed in claim 5 on an optical film, heat-drying the coating, and curing the heat-dried coating by UV irradiation.

* * * * *